(12) United States Patent
Ho et al.

(10) Patent No.: US 9,967,556 B2
(45) Date of Patent: May 8, 2018

(54) VIDEO CODING METHOD USING AT LEAST EVALUATED VISUAL QUALITY AND RELATED VIDEO CODING APPARATUS

(71) Applicant: MEDIATEK INC., Hsin-Chu (TW)

(72) Inventors: Cheng-Tsai Ho, Taichung (TW);
Chi-Cheng Ju, Hsinchu (TW);
Ding-Yun Chen, Taipei (TW)

(73) Assignee: MEDIATEK INC., Hin-Chu (TW)

( * ) Notice: Subject to any disclaimer, the term of this patent is extended or adjusted under 35 U.S.C. 154(b) by 217 days.

(21) Appl. No.: 14/201,944

(22) Filed: Mar. 10, 2014

(65) Prior Publication Data

US 2014/0254663 A1 Sep. 11, 2014

Related U.S. Application Data

(60) Provisional application No. 61/776,053, filed on Mar. 11, 2013.

(51) Int. Cl.
*H04N 19/117* (2014.01)
*H04N 19/196* (2014.01)
(Continued)

(52) U.S. Cl.
CPC ..... *H04N 19/00066* (2013.01); *H04N 19/117* (2014.11); *H04N 19/154* (2014.11);
(Continued)

(58) Field of Classification Search
CPC .. H04N 19/00066; H04N 19/70; H04N 19/86; H04N 19/13; H04N 19/91;
(Continued)

(56) References Cited

U.S. PATENT DOCUMENTS 6,160,846 A 12/2000 Chiang
6,233,283 B1 5/2001 Chiu
(Continued)

FOREIGN PATENT DOCUMENTS

CN 1471319 A 1/2004
CN 1669338 A 9/2005
(Continued)

OTHER PUBLICATIONS

"Objective Quality Assement Methods", Chikkerur et al., 0018-9316 © 2011 IEEE.*

(Continued)

*Primary Examiner* — Dramos I Kalapodas
(74) *Attorney, Agent, or Firm* — Winston Hsu (57) ABSTRACT

One video coding method includes at least the following steps: utilizing a visual quality evaluation module for evaluating visual quality based on data involved in a coding loop; and referring to at least the evaluated visual quality for performing sample adaptive offset (SAO) filtering. Another video coding method includes at least the following steps: utilizing a visual quality evaluation module for evaluating visual quality based on data involved in a coding loop; and referring to at least the evaluated visual quality for deciding a target coding parameter associated with sample adaptive offset (SAO) filtering.

11 Claims, 7 Drawing Sheets

(51) Int. Cl.
*H04N 19/154* (2014.01)
*H04N 19/82* (2014.01)
*H04N 19/46* (2014.01)
*H04N 19/18* (2014.01)

(52) U.S. Cl.
CPC ........... *H04N 19/196* (2014.11); *H04N 19/82* (2014.11); *H04N 19/18* (2014.11); *H04N 19/46* (2014.11)

(58) Field of Classification Search
CPC ............. H04N 19/182; H04N 19/1887; H04N 19/184; H04N 19/14; H04N 19/117; H04N 19/82; H04N 19/154; H04N 19/196; H04N 19/46; H04N 19/18; H04N 19/10; H04N 19/00006; H04N 19/00909; H04N 19/00533; H04N 19/00139; H04N 19/00127; H04N 19/00319; H04N 19/0089; H04N 19/124; H04N 19/00527; H04N 19/146; H04N 19/463; H04N 19/186; H04N 19/80; H04N 19/00951; H04N 19/00884; H04N 19/00303; H04N 19/002; H04L 1/00
See application file for complete search history.

(56) References Cited

U.S. PATENT DOCUMENTS

| | | |
|---|---|---|
| 7,742,532 B2 | 6/2010 | Jeon |
| 7,873,727 B2 | 1/2011 | Pal |
| 8,077,775 B2 | 12/2011 | He |
| 8,111,300 B2 | 2/2012 | Hwang |
| 8,345,777 B2 | 1/2013 | Lee |
| 9,282,328 B2* | 3/2016 | Chen .................. H04N 19/82 |
| 2003/0128754 A1 | 7/2003 | Akimoto |
| 2003/0206587 A1 | 11/2003 | Gomila |
| 2003/0206664 A1 | 11/2003 | Gomila |
| 2004/0114817 A1* | 6/2004 | Jayant ................. H04N 19/00 382/239 |
| 2004/0156559 A1 | 8/2004 | Cheng |
| 2004/0208392 A1 | 10/2004 | Raveendran |
| 2005/0243915 A1 | 11/2005 | Kwon |
| 2006/0114997 A1 | 6/2006 | Lelescu |
| 2006/0215766 A1 | 9/2006 | Wang |
| 2006/0238445 A1* | 10/2006 | Wang ................... H04N 19/176 345/55 |
| 2008/0069247 A1 | 3/2008 | He |
| 2008/0117981 A1 | 5/2008 | Lee |
| 2008/0240252 A1 | 10/2008 | He |
| 2009/0323803 A1 | 12/2009 | Gomila |
| 2010/0220796 A1 | 9/2010 | Yin |
| 2010/0296588 A1 | 11/2010 | Fujii |
| 2011/0033119 A1 | 2/2011 | Rezazadeh |
| 2011/0211637 A1 | 9/2011 | Blum |
| 2011/0222607 A1 | 9/2011 | An |
| 2011/0235715 A1 | 9/2011 | Chien |
| 2011/0255589 A1 | 10/2011 | Saunders |
| 2011/0280321 A1 | 11/2011 | Chou |
| 2011/0293012 A1 | 12/2011 | Au |
| 2011/0310295 A1 | 12/2011 | Chen |
| 2012/0082241 A1* | 4/2012 | Tsai ..................... H04N 19/176 375/240.25 |
| 2012/0163452 A1 | 6/2012 | Horowitz |
| 2012/0177104 A1* | 7/2012 | Budagavi ............ H04N 19/176 375/240.02 |
| 2012/0201475 A1 | 8/2012 | Carmel |
| 2012/0257681 A1 | 10/2012 | Sato |
| 2012/0328004 A1 | 12/2012 | Coban |
| 2012/0328029 A1 | 12/2012 | Sadafale |
| 2013/0044809 A1* | 2/2013 | Chong ................. H04N 19/647 375/240.03 |
| 2013/0051454 A1* | 2/2013 | Sze ..................... H04N 19/70 375/240.02 |
| 2013/0051455 A1* | 2/2013 | Sze ..................... H04N 19/70 375/240.02 |
| 2013/0077871 A1 | 3/2013 | Lu |
| 2013/0083844 A1* | 4/2013 | Chong ................. H04N 19/86 375/240.02 |
| 2013/0094569 A1* | 4/2013 | Chong ................ H04N 19/176 375/240.02 |
| 2013/0094572 A1* | 4/2013 | Van der Auwera ........... H04N 19/00096 375/240.03 |
| 2013/0177068 A1* | 7/2013 | Minoo ............. H04N 19/00127 375/240.02 |
| 2013/0208788 A1* | 8/2013 | Chen ..................... H04N 19/82 375/240.02 |
| 2013/0243090 A1 | 9/2013 | Li |
| 2013/0318253 A1* | 11/2013 | Kordasiewicz ......... H04L 65/80 709/231 |
| 2013/0343447 A1* | 12/2013 | Chen ..................... H04N 19/82 375/240.02 |
| 2014/0002670 A1 | 1/2014 | Kolarov |
| 2014/0056363 A1 | 2/2014 | He |
| 2014/0160239 A1* | 6/2014 | Tian ...................... H04N 7/152 348/43 |
| 2014/0254659 A1 | 9/2014 | Ho |
| 2014/0254662 A1 | 9/2014 | Ho |
| 2014/0254663 A1 | 9/2014 | Ho |
| 2014/0254680 A1 | 9/2014 | Ho |
| 2014/0254689 A1 | 9/2014 | Ho |
| 2014/0321552 A1 | 10/2014 | He |
| 2014/0334559 A1* | 11/2014 | Kim ...................... H04N 19/91 375/240.29 |
| 2016/0044332 A1 | 2/2016 | Maaninen |
| 2017/0208223 A1 | 7/2017 | Laroche |

FOREIGN PATENT DOCUMENTS

| | | | |
|---|---|---|---|
| CN | 1694500 A | 11/2005 | |
| CN | 1695164 A | 11/2005 | |
| CN | 101090502 A | 12/2007 | |
| CN | 101164342 A | 4/2008 | |
| CN | 101232619 A | 7/2008 | |
| CN | 101325711 A | * 12/2008 | ........... H04N 19/146 |
| CN | 100452883 C | 1/2009 | |
| CN | 101489130 A | 7/2009 | |
| CN | 102150427 A | 8/2011 | |
| CN | 102150429 A | 8/2011 | |
| CN | 102415088 A | 4/2012 | |
| CN | 102685472 A | 9/2012 | |
| TW | 201134223 A1 | 10/2011 | |
| WO | 2013030833 A1 | 3/2013 | |
| WO | 2013074365 A1 | 5/2013 | |

OTHER PUBLICATIONS

"Sample Adaptive Offset for HEVC", Chih-Ming Fu 978-1-4577-4 (c) 2011 IEEE.*
Chikkerur et al., "Objective Quality Assement Methods", 0018-9316 © 2011 IEEE.*
Ching-Min Fu et al., "Sample Adaptive Offset for HEVC", Taiwan 30078: Oct. 2011-IEEE978-1-4577-1432-0.*
Chikkerur et al., "Objective Video Quality Assessment Methods: A Classification, Review, and Performance Comparison"; IEEE 0018-9316-Jun. 2011.*
Chikkerur et al., "Objective Video Quality Assessment Methods: A Classification, Review, and Performance Comparison", IEEE Transactions on Broadcasting, vol. 57, No. 2, Jun. 2011, p. 165-182.
"International Search Report" dated Jun. 30, 2014 for International application No. PCT/CN2014/073176, International filing date:Mar. 11, 2014.
"International Search Report" dated Jun. 3, 2014 for International application No. PCT/CN2014/073178, International filing date:Mar. 11, 2014.
"International Search Report" dated Jun. 23, 2014 for International application No. PCT/CN2014/073146, International filing date:Mar. 10, 2014.

(56) References Cited

OTHER PUBLICATIONS

"International Search Report" dated Jun. 13, 2014 for International application No. PCT/CN2014/073171, International filing date:Mar. 11, 2014.
"International Search Report" dated Jun. 18, 2014 for International application No. PCT/CN2014/073167, International filing date:Mar. 11, 2014.

* cited by examiner

VIDEO CODING METHOD USING AT LEAST EVALUATED VISUAL QUALITY AND RELATED VIDEO CODING APPARATUS

CROSS REFERENCE TO RELATED APPLICATIONS

This application claims the benefit of U.S. provisional application No. 61/776,053, filed on Mar. 11, 2013 and incorporated herein by reference.

BACKGROUND

The disclosed embodiments of the present invention relate to video coding, and more particularly, to a video coding method using at least evaluated visual quality determined by one or more visual quality metrics and a related video coding apparatus.

The conventional video coding standards generally adopt a block based (or coding unit based) coding technique to exploit spatial redundancy. For example, the basic approach is to divide the whole source frame into a plurality of blocks (coding units), perform prediction on each block (coding unit), transform residues of each block (coding unit) using discrete cosine transform, and perform quantization and entropy encoding. Besides, a reconstructed frame is generated in a coding loop to provide reference pixel data used for coding following blocks (coding units). For certain video coding standards, in-loop filter(s) may be used for enhancing the image quality of the reconstructed frame. For example, a de-blocking filter is included in an H.264 coding loop, and a de-blocking filter and a sample adaptive offset (SAO) filter are included in an HEVC (High Efficiency Video Coding) coding loop.

Generally speaking, the coding loop is composed of a plurality of processing stages, including transform, quantization, intra/inter prediction, etc. Based on the conventional video coding standards, one processing stage selects a video coding mode based on pixel-based distortion value derived from a source frame (i.e., an input frame to be encoded) and a reference frame (i.e., a reconstructed frame generated during the coding procedure). For example, the pixel-based distortion value may be a sum of absolute differences (SAD), a sum of transformed differences (SATD), or a sum of square differences (SSD). However, the pixel-based distortion value merely considers pixel value differences between pixels of the source frame and the reference frame, and sometimes is not correlated to the actual visual quality of a reconstructed frame generated from decoding an encoded frame. Specifically, based on experimental results, different processed images, each derived from an original image and having the same pixel-based distortion (e.g., the same mean square error (MSE)) with respect to the original image, may present different visual quality to a viewer. That is, the smaller pixel-based distortion does not mean better visual quality in the human visual system. Hence, an encoded frame generated based on video coding modes each selected due to a smallest pixel-based distortion value does not guarantee that a reconstructed frame generated from decoding the encoded frame would have the best visual quality.

SUMMARY

In accordance with exemplary embodiments of the present invention, a video coding method using at least evaluated visual quality obtained by one or more visual quality metrics and a related video coding apparatus are proposed.

According to a first aspect of the present invention, an exemplary video coding method is disclosed. The exemplary video coding method includes: utilizing a visual quality evaluation module for evaluating visual quality based on data involved in a coding loop; and referring to at least the evaluated visual quality for performing sample adaptive offset (SAO) filtering.

According to a second aspect of the present invention, another exemplary video coding method is disclosed. The exemplary video coding method includes: utilizing a visual quality evaluation module for evaluating visual quality based on data involved in a coding loop; and referring to at least the evaluated visual quality for deciding a target coding parameter associated with sample adaptive offset (SAO) filtering.

According to a third aspect of the present invention, an exemplary video coding apparatus is disclosed. The exemplary video coding apparatus includes a visual quality evaluation module and a coding circuit. The visual quality evaluation module is arranged to evaluate visual quality based on data involved in a coding loop. The coding circuit has the coding loop included therein, and is arranged to refer to at least the evaluated visual quality for performing sample adaptive offset (SAO) filtering.

According to a fourth aspect of the present invention, another exemplary video coding apparatus is disclosed. The exemplary video coding apparatus includes a visual quality evaluation module and a coding circuit. The visual quality evaluation module is arranged to evaluate visual quality based on data involved in a coding loop. The coding circuit has the coding loop included therein, and is arranged to refer to at least the evaluated visual quality for deciding a target coding parameter associated with sample adaptive offset (SAO) filtering.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

The concept of the present invention is to incorporate characteristics of a human visual system into a video coding procedure to improve the video compression efficiency or visual quality. More specifically, visual quality evaluation is involved in the video coding procedure such that a reconstructed frame generated from decoding an encoded frame is capable of having enhanced visual quality. Further details of the proposed visual quality based video coding design are described as below.

Figure 1:
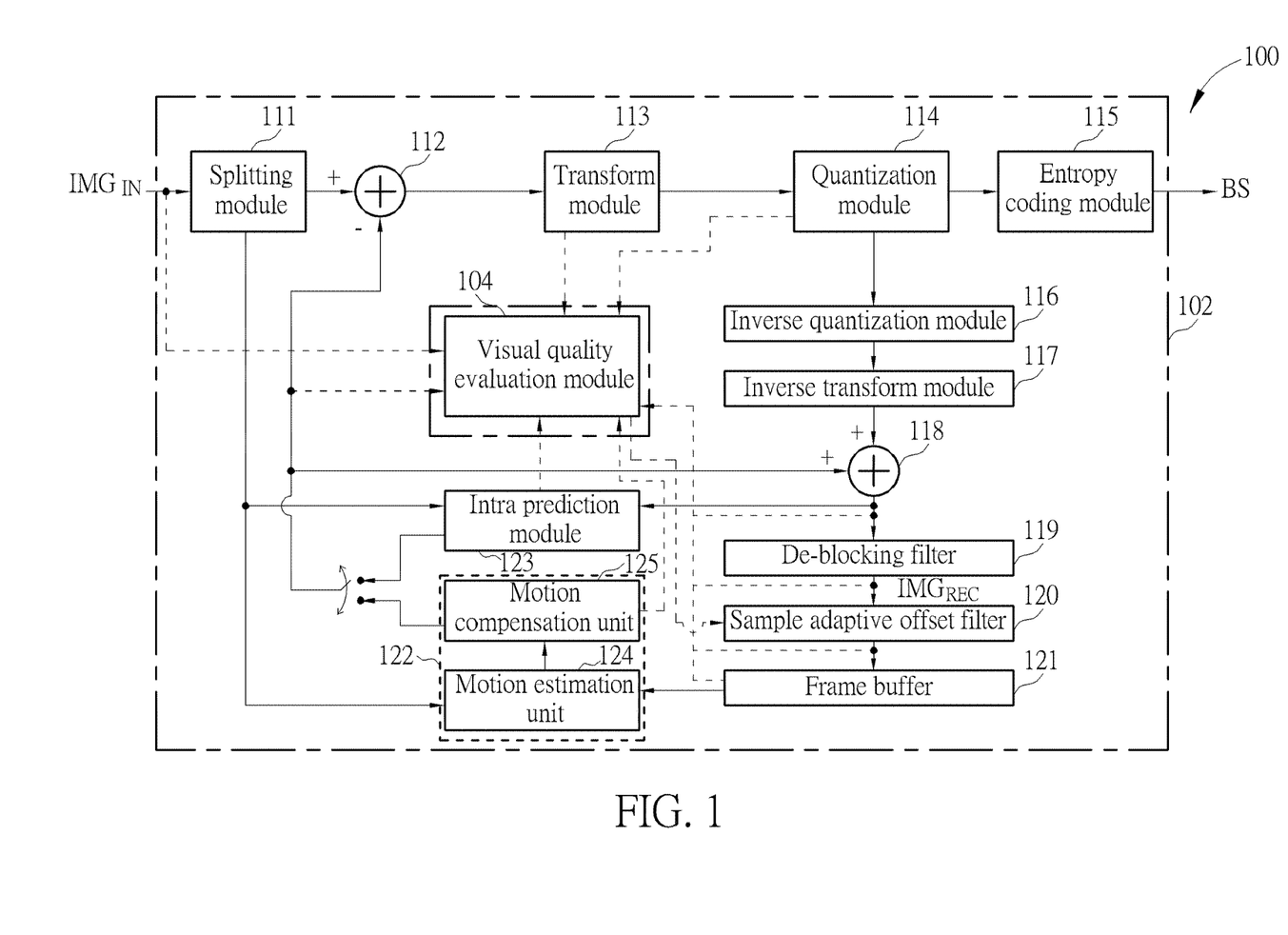
FIG. 1 is a block diagram illustrating a video coding apparatus according to an embodiment of the present invention.

FIG. 1 is a block diagram illustrating a video coding apparatus according to an embodiment of the present invention. The video coding apparatus 100 is used to encode a source frame $IMG_{IN}$ to generate a bitstream BS carrying encoded frame information corresponding to the source frame $IMG_{IN}$. In this embodiment, the video coding apparatus 100 includes a coding circuit 102 and a visual quality evaluation module 104. By way of example, but not limitation, the architecture of the coding circuit 102 maybe configured based on any conventional video encoding architecture. It should be noted that the coding circuit 102 may follow the conventional video encoding architecture to have a plurality of processing stages implemented therein; however, this by no means implies that each of the processing stages included in the coding circuit 102 must be implemented using a conventional design. For example, any of the processing stages that is associated with the visual quality evaluation performed by the visual quality evaluation module 104 and/or is affected/controlled by the visual quality obtained by the visual quality evaluation module 104 still falls within the scope of the present invention.

As shown in FIG. 1, the coding circuit 102 includes a coding loop composed of a splitting module 111, a subtractor (i.e., an adder configured to perform a subtraction operation) 112, a transform module 113, a quantization module 114, an inverse quantization module 116, an inverse transform module 117, an adder 118, a de-blocking filter 119, a sample adaptive offset (SAO) filter 120, a frame buffer 121, an inter prediction module 122, and an intra prediction module 123, where the inter prediction module 122 includes a motion estimation unit 124 and a motion compensation unit 125. The coding circuit 102 further includes an entropy coding module 115 arranged to generate the bitstream BS by performing entropy encoding upon quantized coefficients generated from the quantization module 114. It should be noted that one or both of the de-blocking filter 119 and the SAO filter 120 may be omitted/bypassed for certain applications. That is, the de-blocking filter 119 and/or the SAO filter 120 may be optional, depending upon actual design requirement. As a person skilled in the pertinent art should readily understand fundamental operations of the processing stages included in the coding circuit 102, further description is omitted here for brevity. Concerning one or more of the processing stages that are affected/controlled by the visual quality determined by the visual quality evaluation module 104, further description will be given as below.

One key feature of the present invention is using the visual quality evaluation module 104 to evaluate visual quality based on data involved in the coding loop of the coding circuit 102. In one embodiment, the data involved in the coding loop and processed by the visual quality evaluation module 104 maybe raw data of the source frame $IMG_{IN}$. In another embodiment, the data involved in the coding loop and processed by the visual quality evaluation module 104 may be processed data derived from raw data of the source frame $IMG_{IN}$. For example, the processed data used to evaluate the visual quality may be transformed coefficients generated by the transform module 113, quantized coefficients generated by the quantization module 114, reconstructed pixel data before the optional de-blocking filter 119, reconstructed pixel data after the optional de-blocking filter 119, reconstructed pixel data before the optional SAO filter 120, reconstructed pixel data after the optional SAO filter 120, reconstructed pixel data stored in the frame buffer 121, motion-compensated pixel data generated by the motion compensation unit 125, or intra-predicted pixel data generated by the intra prediction module 123.

The visual quality evaluation performed by the visual quality evaluation module 104 may calculate one or more visual quality metrics to decide one evaluated visual quality. For example, the evaluated visual quality is derived from checking at least one image characteristic that affects human visual perception, and the at least one image characteristic may include sharpness, noise, blur, edge, dynamic range, blocking artifact, mean intensity (e.g., brightness/luminance), color temperature, scene composition (e.g., landscape, portrait, night scene, etc.), human face, animal presence, image content that attracts more or less interest (e.g., region of interest (ROI)), spatial masking (i.e., human's visual insensitivity of more complex texture), temporal masking (i.e., human's visual insensitivity of high-speed moving object), or frequency masking (i.e., human's visual insensitivity of higher pixel value variation). By way of example, the noise metric may be obtained by calculating an ISO 15739 visual noise value VN, where $VN=\sigma_L^*+0.852\cdot\sigma_u^*+0.323\cdot\sigma_u^*$ Alternatively, the noise metric may be obtained by calculating other visual noise metric, such as an S-CIELAB metric, a vSNR (visual signal-to-noise ratio) metric, or a Keelan NPS (noise power spectrum) based metric. The sharpness/blur metric may be obtained by measuring edge widths. The edge metric may be a ringing metric obtained by measuring ripples or oscillations around edges.

In one exemplary design, the visual quality evaluation module 104 calculates a single visual quality metric (e.g., one of the aforementioned visual quality metrics) according to the data involved in the coding loop of the coding circuit 102, and determines each evaluated visual quality solely based on the single visual quality metric. In other words, one evaluated visual quality may be obtained by referring to a single visual quality metric only.

In another exemplary design, the visual quality evaluation module 104 calculates a plurality of distinct visual quality metrics (e.g., many of the aforementioned visual quality metrics) according to the data involved in the coding loop of the coding circuit 102, and determines each evaluated visual quality based on the distinct visual quality metrics. In other words, one evaluated visual quality may be obtained by referring to a composition of multiple visual quality metrics. For example, the visual quality evaluation module 104 may be configured to assign a plurality of pre-defined weighting factors to multiple visual quality metrics (e.g., a noise metric and a sharpness metric), and decide one evaluated visual quality by a weighted sum derived from the weighting factors and the visual quality metrics. For another example, the visual quality evaluation module 104 may employ a Minkowski equation to determine a plurality of non-linear weighting factors for the distinct visual quality metrics, respectively; and then determine one evaluated visual quality by combining the distinct visual quality metrics according to respective non-linear weighting factors. Specifically, based on the Minkowski equation, the evaluated visual quality $\Delta Q_m$ is calculated using following equation:

$$\Delta Q_m = \left(\sum_i (\Delta Q_i)^{n_m}\right)^{1/n_m}, \text{ where } n_m = 1 + 2 \cdot \tanh\left(\frac{(\Delta Q)_{max}}{16.9}\right),$$

$\Delta Q_i$ is derived from each of the distinct visual quality metrics, and 16.9 is a single universal parameter based on psychophysical experiments. For yet another example, the visual quality evaluation module 104 may employ a training-based manner (e.g., a support vector machine (SVM)) to determine a plurality of trained weighting factors for the distinct visual quality metrics, respectively; and then determine one evaluated visual quality by combining the distinct visual quality metrics according to respective trained weighting factors. Specifically, supervised learning models with associated learning algorithms are employed to analyze the distinct visual quality metrics and recognized patterns, and accordingly determine the trained weighting factors.

After the evaluated visual quality is generated by the visual quality evaluation module 104, the evaluated visual quality is referenced by the SAO filter 120 to control/configure the operation of SAO filtering. As the evaluated visual quality is involved in making the video coding mode decision for SAO filtering, the source frame $IMG_{IN}$ is encoded based on characteristics of the human visual system to thereby allow a decoded/reconstructed frame to have enhanced visual quality.

Figure 2:
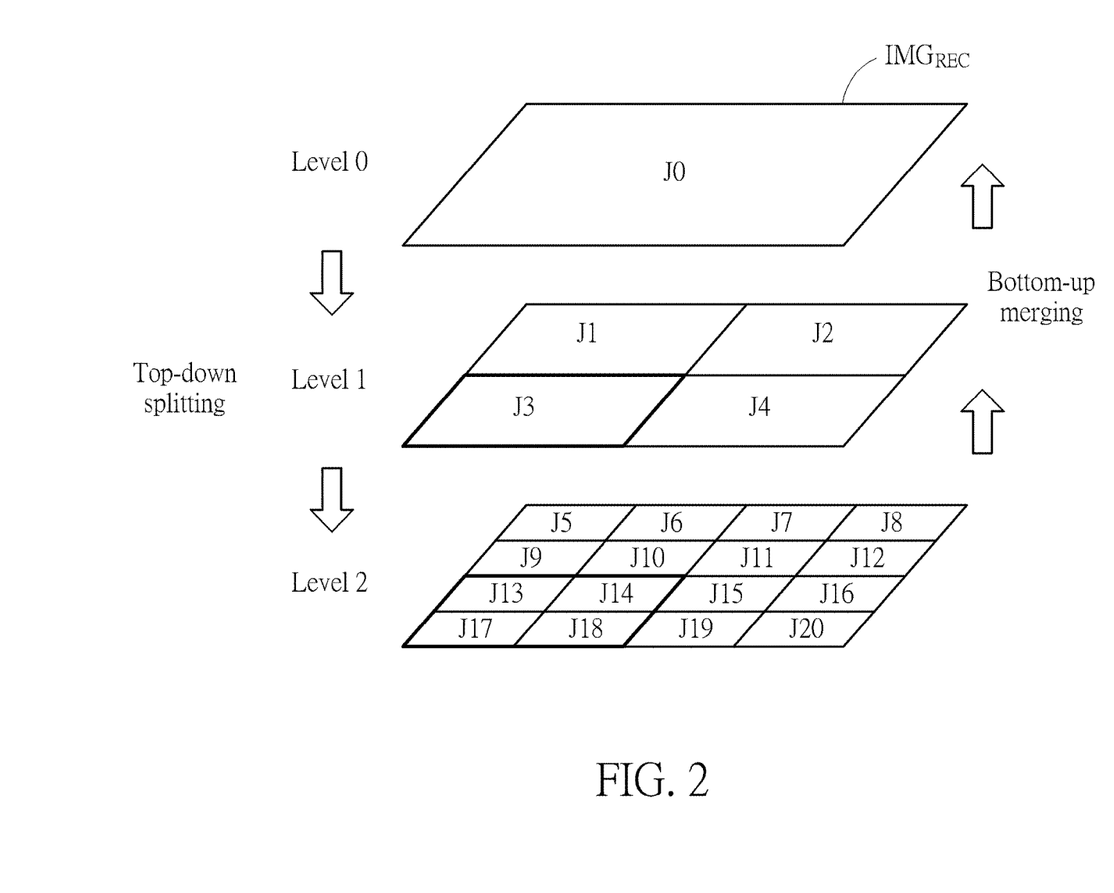
FIG. 2 is a diagram illustrating a conventional video coding design of deciding a multi-level region size for each region obtained from partitioning a reconstructed frame.
Figure 3:
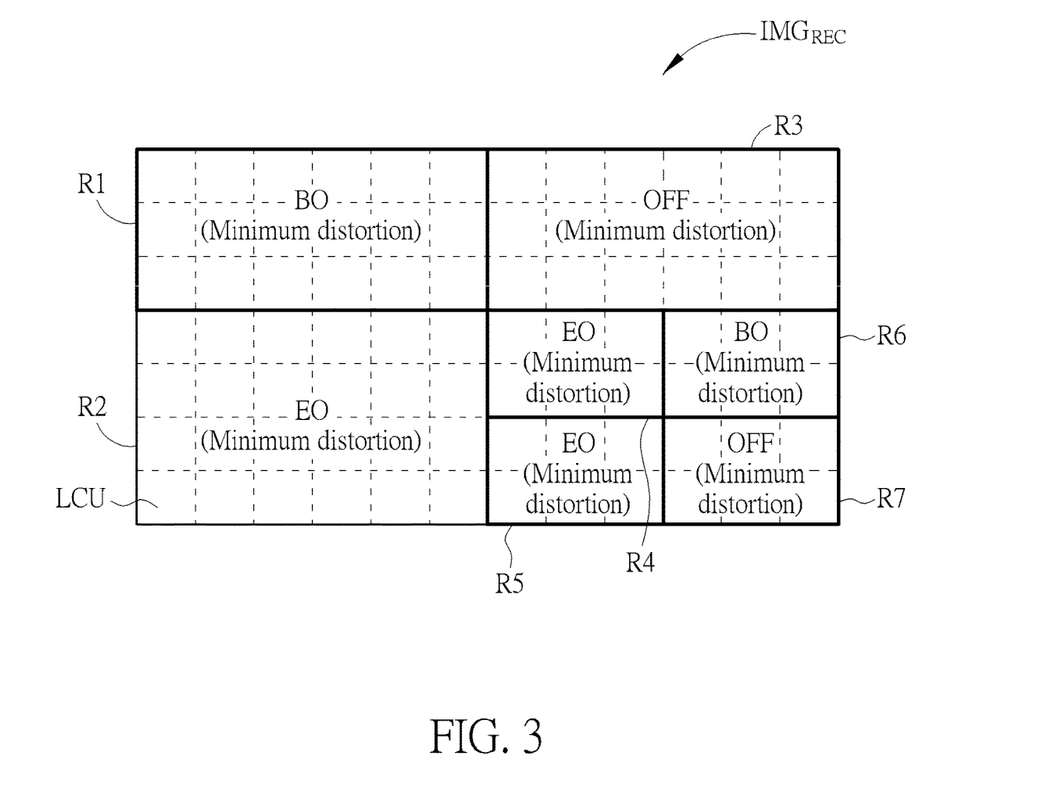
FIG. 3 is a diagram illustrating a conventional video coding design of deciding a sample adaptive offset (SAO) type for each region obtained from partitioning the reconstructed frame.
Figure 4:
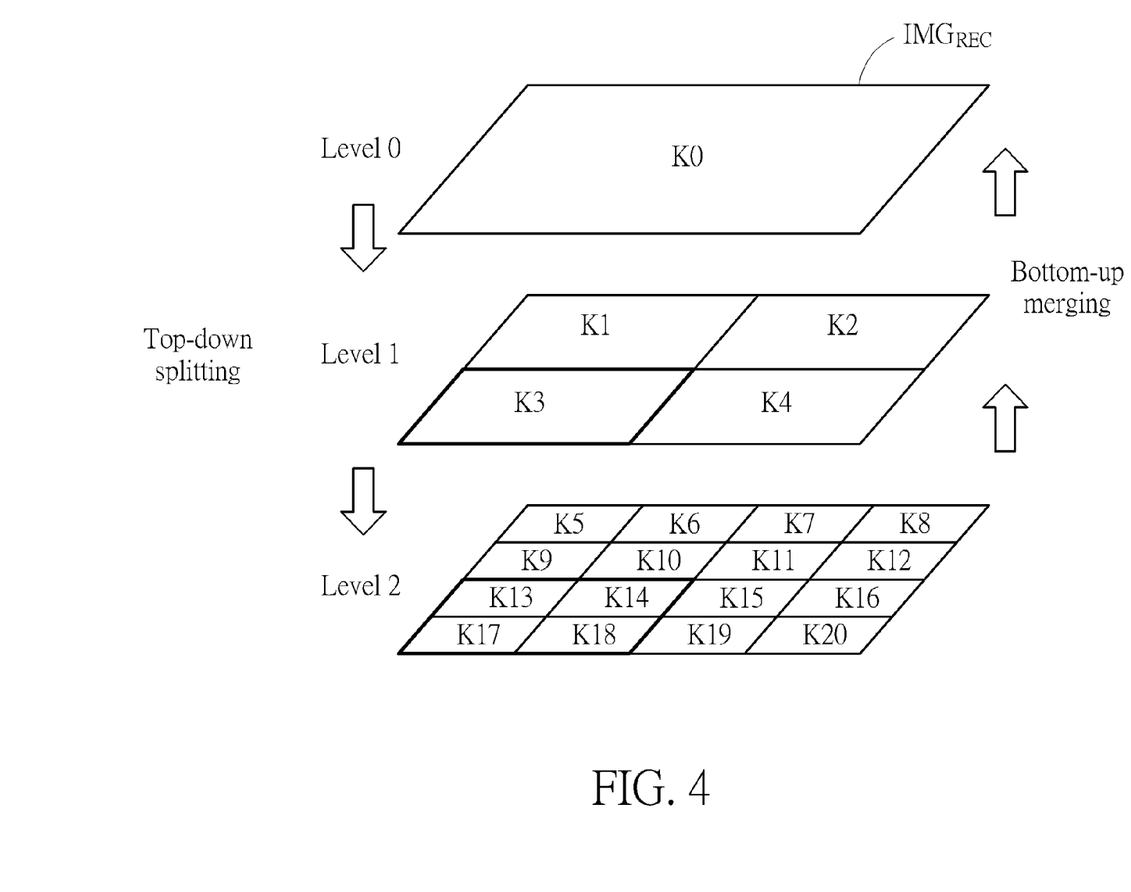
FIG. 4 is a diagram illustrating a proposed visual quality-based video coding design of deciding a multi-level region size for each region obtained from partitioning a reconstructed frame.
Figure 5:
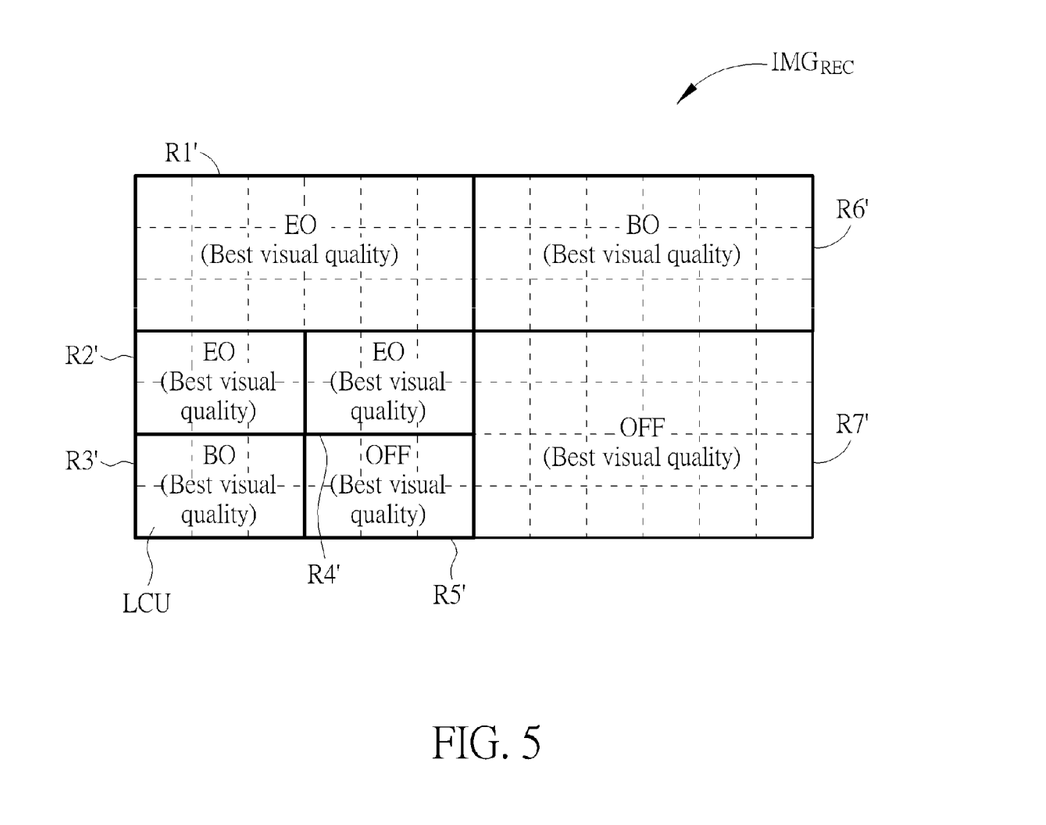
FIG. 5 is a diagram illustrating a proposed visual quality-based video coding design of deciding an SAO type for each region obtained from partitioning the reconstructed frame.

For example, the SAO filter 120 may decide a multi-level region size and/or select one of SAO types including at least one type for band offset (BO), at least one type for edge offset (EO) and one type for no processing (OFF), where the evaluated visual quality in this case may provide visual quality information for each region within a reconstructed frame during decision of the multi-level region size and the SAO type for the region. Please refer to FIGS. 2-5. FIG. 2 is a diagram illustrating a conventional video coding design of deciding a multi-level region size for each region obtained from partitioning a reconstructed frame. FIG. 3 is a diagram illustrating a conventional video coding design of deciding an SAO type for each region obtained from partitioning the reconstructed frame. FIG. 4 is a diagram illustrating a proposed visual quality based video coding design of deciding a multi-level region size for each region obtained from partitioning a reconstructed frame. FIG. 5 is a diagram illustrating a proposed visual quality based video coding design of deciding an SAO type for each region obtained from partitioning the reconstructed frame. Taking the HEVC (High Efficiency Video Coding) standard for example, a frame may be divided into largest coding units (LCUs), and the LCUs may be further divided into smaller blocks, i.e., coding units (CUs). Concerning the conventional distortion-based SAO filtering operation, the encoder divides a reconstructed frame $IMG_{REC}$ into LCU-based regions according to a top-down splitting manner and decides which of the SAO types is to be used for each region; or the encoder merges LCU-based regions of the reconstructed frame $IMG_{REC}$ into larger LCU-based regions according to a bottom-up merging manner and decides which of the SAO types is to be used for each region. More specifically, taking the top-down splitting manner for example, the encoder decides the best LCU quadtree partitioning for the reconstructed frame $IMG_{REC}$ and the SAO type for each region based on pixel-based distortion. Hence, the conventional video coding design calculates a pixel-based distortion value Distortion (C, R) for each possible region partition in the reconstructed frame $IMG_{REC}$, where R represent pixels in a region of a reconstructed frame, C represent pixels in a co-located region of a source frame, and the distortion value Distortion (C, R) may be an SAD value or other difference metric. For example, Jx shown in FIG. 2 represents the distortion value Distortion (C, R) of each possible region partition in the reconstructed frame $IMG_{REC}$, where x=0~20. If J0>J1+J2+J3+J4, one region at level 0 (i.e., the whole area of the reconstructed frame $IMG_{REC}$) is split into four smaller-sized regions at level 1. Similarly, if J3>J13+J14+J17+J18, one region at level 1 (i.e., a partial area of the reconstructed frame $IMG_{REC}$) is split into four smaller-sized regions at level 2. In this way, the best LCU quadtree partitioning for the reconstructed frame $IMG_{REC}$ can be decided based on the pixel-based distortion of each possible region partition. As shown in FIG. 3, the reconstructed frame $IMG_{REC}$ with the best LCU quadtree partitioning may include regions R1, R2, R3, R4, R5, R6 and R7, where each small block shown in FIG. 3 is one LCU.

The conventional video coding design also decides an SAO type for each region in the reconstructed frame $IMG_{REC}$ based on pixel-based distortion. For example, regarding each of the regions R1-R7, the encoder estimates a pixel-based distortion value Distortion (C, R) resulting from using each of the SAO types, and selects one SAO type with the minimum pixel-based distortion to set the final SAO type for the region, where R represent pixels in a region of a reconstructed frame obtained using the tested SAO type, C represent pixels in a co-located region of a source frame, and the distortion value Distortion (C, R) may be an SAD value or other difference metric. As shown in FIG. 3, regions R1 and R6 will be processed by SAO filtering using BO type, regions R2, R4 and R5 will be processed by SAO filtering using EO type, and regions R3 and R7 will be processed by SAO filtering using OFF type.

As can be seen from FIG. 2 and FIG. 3, the multi-level region size and the SAO type for each region are determined without actually considering the human visual perception. Hence, a reconstructed frame generated from the conventional distortion-based SAO filter may not have the best visual quality.

In contrast to the conventional video coding design, the present invention proposes using the evaluated visual quality VQ (C or R') derived from data involved in the coding loop of the coding unit 102 to decide the multi-level region size and/or the SAO type for each region in the reconstructed frame $IMG_{REC}$, where one evaluated visual quality VQ (C or R') may be obtained by a single visual quality metric or a composition of multiple visual quality metrics, R' represents processed data derived from raw data of the source frame $IMG_{IN}$ (particularly, processed data derived from processing pixel data of one co-located region in the source frame $IMG_{IN}$), and C represents raw data of the source frame $IMG_{IN}$ (particularly, pixel data of one co-located region in the source frame $IMG_{IN}$). For example, Kx shown in FIG. 4 represents the visual quality VQ (C or R') of each possible region partition in the reconstructed frame $IMG_{REC}$, where x=0~20. Similarly, each region may be determined by a top-down splitting manner or a bottom-up merging manner. For example, If K0>K1+K2+K3+K4, one region at level 0 (i.e., the whole area of the reconstructed frame $IMG_{REC}$) is split into four smaller-sized regions at level 1. Similarly, if K3>K13+K14+K17+K18, one region at level 1 (i.e., a partial area of the reconstructed frame $IMG_{REC}$) is further split into four smaller-sized regions at level 2. In this way, the best LCU quadtree partitioning for the reconstructed frame $IMG_{REC}$ can be decided by the SAO filter 120 based on evaluated visual quality of each possible region partition. As shown in FIG. 5, the reconstructed frame $IMG_{REC}$ with the best LCU quadtree partitioning may include regions R1', R2', R3', R4', R5', R6' and R7', where each small block shown in FIG. 5 is one LCU.

The SAO filter 120 also decides an SAO type for each region in the reconstructed frame $IMG_{REC}$ based on the visual quality. For example, regarding each of the regions R1'-R7', the SAO filter 120 estimates one visual quality VQ (C or R') for each of the SAO types, and selects one SAO type with the best visual quality to set the final SAO type for the region, where R' represent pixels in a region of a reconstructed frame obtained using the tested SAO type, and C represent pixels in a co-located region of a source frame. As shown in FIG. 5, regions R1', R2' and R4' will be processed by SAO filtering using EO type, regions R3' and R6' will be processed by SAO filtering using BO type, and regions R5' and R7' will be processed by SAO filtering using OFF type.

In an alternative design, both of the evaluated visual quality (e.g., VQ (C or R')) and the pixel-based distortion (e.g., Distortion (C, R)) may be involved in deciding multi-level region size and/or SAO type for each region within the reconstructed frame $IMG_{REC}$. For example, the SAO filter 120 refers to the evaluated visual quality to find a first SAO filtering setting (e.g., a first setting of multi-level region size/SAO type), refers to the pixel-based distortion to find a second SAO filtering setting (e.g., a second setting of multi-level region size/SAO type), and finally selects one of the first SAO filtering setting and the second SAO filtering setting as a target SAO filtering setting (e.g., a final setting of multi-level region size/SAO type).

For another example, the SAO filter 120 performs a coarse decision according to one of the evaluated visual quality and the pixel-based distortion to select M coarse SAO filtering settings (e.g., coarse settings of multi-level region size/SAO type) from all possible N SAO filtering settings, and performs a fine decision according to another of the evaluated visual quality and the pixel-based distortion to determine P fine SAO filtering settings (e.g., fine settings of multi-level region size/SAO type) from the coarse SAO filtering settings (N>M & M>P≥1), wherein a target SAO filtering setting (e.g., a target setting of multi-level region size/SAO type) is derived from the P fine SAO filtering settings. In a case where P=1, the target SAO filtering setting is directly determined by the fine decision based on the pixel-based distortion if the coarse decision is made based on the evaluated visual quality; or the target SAO filtering setting is directly determined by the fine decision based on the evaluated visual quality if the coarse decision is made based on the pixel-based distortion.

Figure 6:
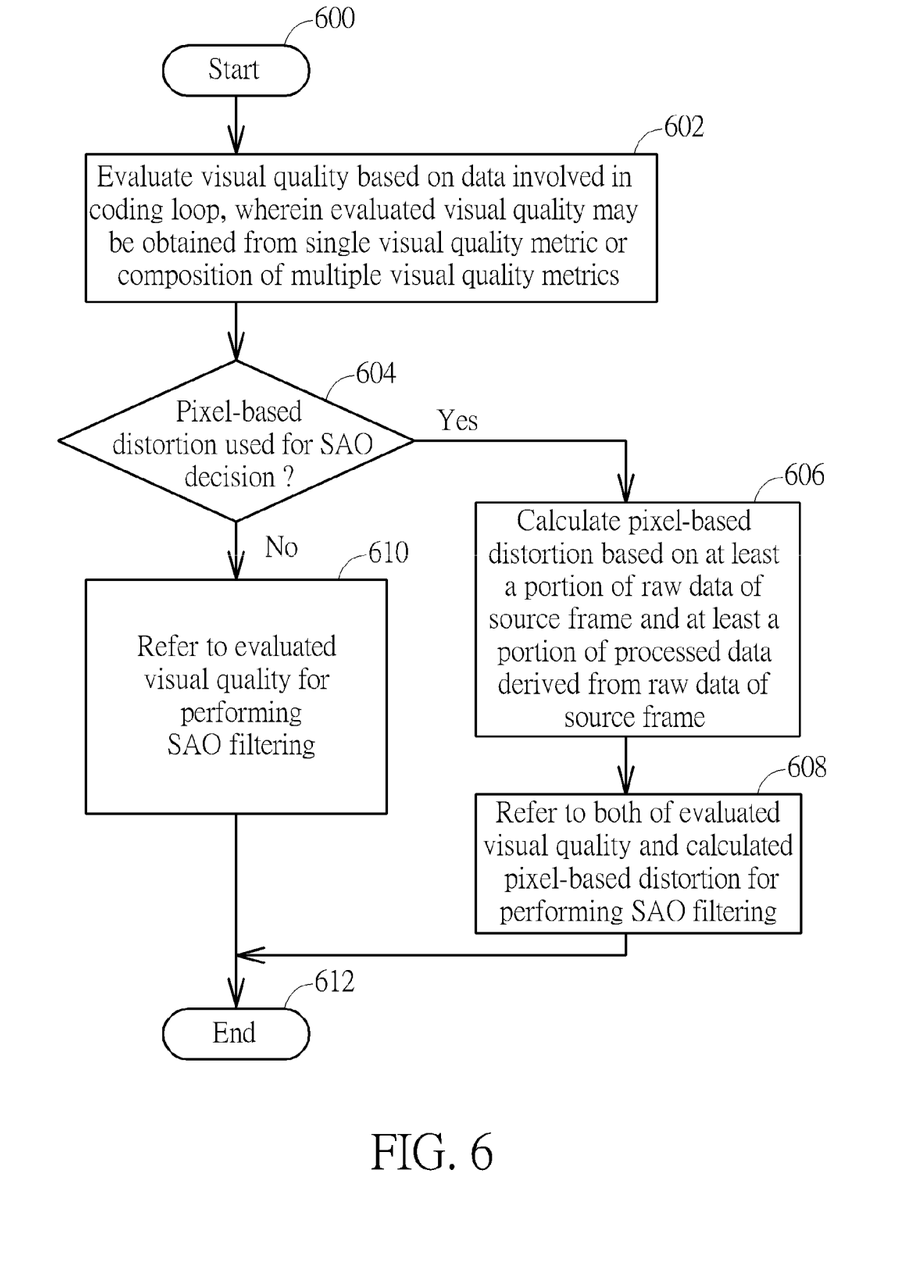
FIG. 6 is a flowchart illustrating a video coding method according to a first embodiment of the present invention.

FIG. 6 is a flowchart illustrating a video coding method according to a first embodiment of the present invention. Provided that the result is substantially the same, the steps are not required to be executed in the exact order shown in FIG. 6. The video coding method may be briefly summarized as below.

Step 600: Start.

Step 602: Evaluate visual quality based on data involved in a coding loop, wherein the data involved in the coding loop may be raw data of a source frame or processed data derived from the raw data of the source frame, and each evaluated visual quality may be obtained from a single visual quality metric or a composition of multiple visual quality metrics.

Step 604: Check if pixel-based distortion should be used for SAO filtering decision. If yes, go to step 606; otherwise, go to step 610.

Step 606: Calculate the pixel-based distortion based on at least a portion (i.e., part or all) of raw data of the source frame and at least a portion (i.e., part or all) of processed data derived from the raw data of the source frame.

Step 608: Refer to both of the evaluated visual quality and the calculated pixel-based distortion for performing the SAO filtering. For example, both of the evaluated visual quality and the calculated pixel-based distortion may be used for deciding the multi-level region size and/or the SAO type. Go to step 612.

Step 610: Refer to the evaluated visual quality for performing the SAO filtering. For example, the evaluated visual quality may be used for deciding the multi-level region size and/or the SAO type.

Step 612: End.

As a person skilled in the art can readily understand details of each step in FIG. 6 after reading above paragraphs, further description is omitted here for brevity.

As mentioned above, the evaluated visual quality determined by the visual quality evaluation module 104 can be referenced by the SAO filter 120 during SAO filtering. However, this is not meant to be a limitation of the present invention. In a second application, the SAO filter 120 may be arranged to refer to the aforementioned visual quality determined by the visual quality evaluation module 104 for deciding a target coding parameter associated with SAO filtering, where the target coding parameter may be an SAO parameter. In addition, the target coding parameter set based on the evaluated visual quality may be included in the bitstream BS generated by encoding the source frame $IMG_{IN}$. That is, the target coding parameter is a signaling parameter which is transmitted to a video decoding apparatus to facilitate the decoder-side video processing operation. As the visual quality evaluation performed by the visual quality evaluation module 104 has been detailed above, further description directed to obtaining the evaluated visual quality based on one or more visual quality metrics is omitted here for brevity.

In an alternative design, both of the evaluated visual quality (which is obtained based on data involved in the coding loop) and the pixel-based distortion (which is generated based on at least a portion of raw data of the source image $IMG_{IN}$ and at least a portion of processed data derived from the raw data of the source frame $IMG_{IN}$) are used to decide a target coding parameter (e.g., an SAO parameter) associated with SAO filtering, where the target coding parameter set based on the evaluated visual quality and the pixel-based distortion may be included in the bitstream BS and transmitted to a video decoding apparatus.

For example, the SAO filter 120 refers to the evaluated visual quality to decide a first parameter setting with best visual quality, refers to the pixel-based distortion to decide a second parameter setting with minimum distortion, and finally selects one of the first parameter setting and the second parameter setting to set the target coding parameter. For another example, the SAO filter 120 performs a coarse decision according to one of the evaluated visual quality and the pixel-based distortion to determine a plurality of coarse parameter settings, and performs a fine decision according to another of the evaluated visual quality and the pixel-based distortion to determine at least one fine parameter setting from the coarse parameter settings, wherein the target coding parameter (e.g., the SAO parameter) is derived from the at least one fine parameter setting.

Figure 7:
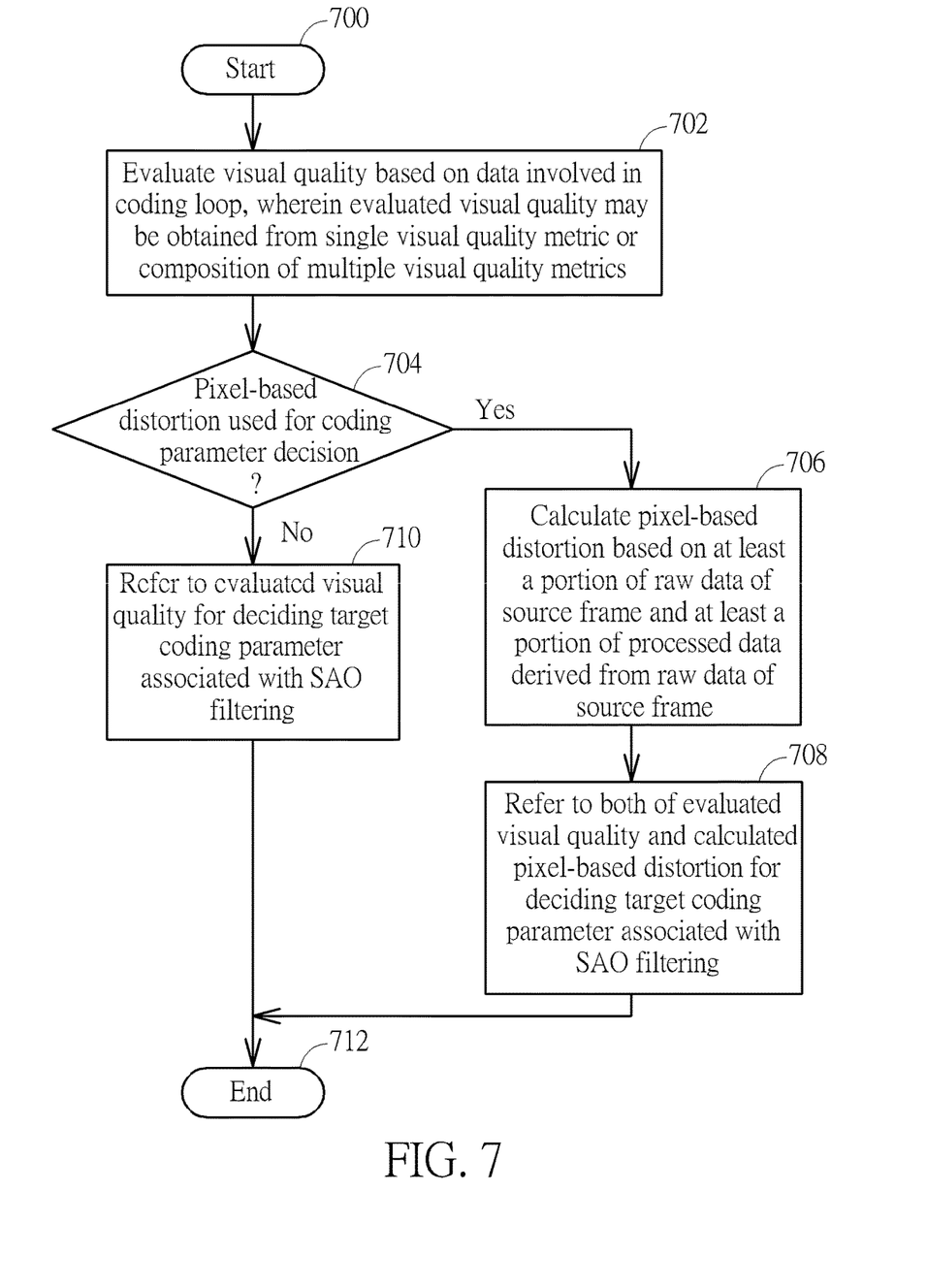
FIG. 7 is a flowchart illustrating a video coding method according to a second embodiment of the present invention.

FIG. 7 is a flowchart illustrating a video coding method according to a second embodiment of the present invention. Provided that the result is substantially the same, the steps are not required to be executed in the exact order shown in FIG. 7. The video coding method may be briefly summarized as below.

Step 700: Start.

Step 702: Evaluate visual quality based on data involved in a coding loop, wherein the data involved in the coding loop may be raw data of a source frame or processed data derived from the raw data of the source frame, and each evaluated visual quality may be obtained from a single visual quality metric or a composition of multiple visual quality metrics.

Step 704: Check if pixel-based distortion should be used for coding parameter decision. If yes, go to step 706; otherwise, go to step 710.

Step 706: Calculate the pixel-based distortion based on at least a portion (i.e., part or all) of raw data of the source frame and at least a portion (i.e., part or all) of processed data derived from the raw data of the source frame.

Step 708: Refer to both of the evaluated visual quality and the calculated pixel-based distortion for deciding a target coding parameter (e.g., an SAO parameter) associated with SAO filtering in video coding. Go to step 712.

Step 710: Refer to the evaluated visual quality for deciding a target coding parameter (e.g., an SAO parameter) associated with SAO filtering in video coding.

Step 712: End.

As a person skilled in the art can readily understand details of each step in FIG. 7 after reading above paragraphs, further description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video coding method performed by a video coding apparatus, comprising:
    utilizing a visual quality evaluation circuit for evaluating visual quality based on data involved in a coding loop; and
    referring to at least the evaluated visual quality for performing sample adaptive offset (SAO) filtering upon a reconstructed frame generated by the coding loop;
    wherein the evaluated visual quality comprises visual quality information evaluated for a plurality of candidate regions in the reconstructed frame,
    wherein visual quality information evaluated for each of the candidate regions is decided based on at least one visual quality metric that is calculated according to:
    raw data of a source frame,
    transformed coefficients,
    quantized coefficients,
    reconstructed pixel data fed into de-blocking filtering,
    reconstructed pixel data output by the de-blocking filtering,
    reconstructed pixel data fed into the SAO filtering,
    reconstructed pixel data output by the SAO filtering,
    reconstructed pixel data stored in a frame buffer,
    motion-compensated pixel data, or
    intra-predicted pixel data, and
    wherein, the SAO filtering performs first visual quality comparison using the visual quality information of the candidate regions, and decides one partitioning of the reconstructed frame according to a result of the first visual quality comparison; or
    wherein the reconstructed frame is partitioned into a plurality of regions, the evaluated visual quality comprises visual quality information evaluated for a plurality of candidate SAO types of each of the regions, visual quality information evaluated for each of the candidate SAO types is decided based on at least one visual quality metric that is calculated according to:
    raw data of the source frame,
    transformed coefficients,
    quantized coefficients,
    reconstructed pixel data fed into the de-blocking filtering,
    reconstructed pixel data output by the de-blocking filtering,
    reconstructed pixel data fed into the SAO filtering,
    reconstructed pixel data output by the SAO filtering,
    reconstructed pixel data stored in the frame buffer,
    motion-compensated pixel data, or
    intra-predicted pixel data, and
    wherein, the SAO filtering performs second visual quality comparison using the visual quality information of the candidate SAO types, and decides one SAO type of said each of the regions by a candidate SAO type with best visual quality that is selected from the candidate SAO types according to a result of the second visual quality comparison, by which an improved video compression efficiency and enhanced visual quality are obtained.

2. The video coding method of claim 1, wherein the evaluated visual quality is derived from checking at least one image characteristic that affects human visual perception, and the at least one image characteristic includes sharpness, noise, blur, edge, dynamic range, blocking artifact, mean intensity, color temperature, scene composition, human face, animal presence, image content that attracts more or less interest, spatial masking, temporal masking, or frequency masking.

3. The video coding method of claim 1, wherein the step of evaluating the visual quality comprises:
    calculating a single visual quality metric according to the data involved in the coding loop; and
    determining each evaluated visual quality solely based on the single visual quality metric.

4. The video coding method of claim 1, wherein the step of evaluating the visual quality comprises:
    calculating a plurality of distinct visual quality metrics according to the data involved in the coding loop; and
    determining each evaluated visual quality based on the distinct visual quality metrics.

5. The video coding method of claim 4, wherein the step of determining each evaluated visual quality based on the distinct visual quality metrics comprises:
    determining a plurality of weighting factors; and
        determining each evaluated visual quality by combining the distinct visual quality metrics according to the weighting factors.

6. The video coding method of claim 5, wherein the weighting factors are determined by training.

7. The video coding method of claim 1, wherein the candidate SAO types comprise at least one type for band offset (BO), at least one type for edge offset (EO), and one type for no processing.

8. The video coding method of claim 1, further comprising:
   calculating pixel-based distortion based on at least a portion of raw data of a source frame and at least a portion of processed data derived from the raw data of the source frame;
   wherein the step of performing the SAO filtering comprises:
      performing the SAO filtering according to the evaluated visual quality and the pixel-based distortion.

9. The video coding method of claim 8, wherein the step of performing the SAO filtering according to the evaluated visual quality and the pixel-based distortion comprises:
   performing a coarse decision according to one of the evaluated visual quality and the pixel-based distortion to determine a plurality of coarse SAO filtering settings; and
   performing a fine decision according to another of the evaluated visual quality and the pixel-based distortion to determine at least one fine SAO filtering setting from the coarse SAO filtering settings, wherein a target SAO filtering setting is derived from the at least one fine SAO filtering setting.

10. The video coding method of claim 1, wherein a target coding parameter associated with the SAO filtering is included in a bitstream generated by encoding the source frame.

11. A video coding apparatus, comprising:
   a visual quality evaluation circuit, arranged to evaluate visual quality based on data involved in a coding loop; and
   a coding circuit, comprising the coding loop, the coding circuit arranged to refer to at least the evaluated visual quality for performing sample adaptive offset (SAO) filtering upon a reconstructed frame generated by the coding loop;
   wherein the evaluated visual quality comprises visual quality information evaluated for a plurality of candidate regions in the reconstructed frame, visual quality information evaluated for each of the candidate regions is decided based on at least one visual quality metric that is calculated according to raw data of a source frame, transformed coefficients, quantized coefficients, reconstructed pixel data fed into de-blocking filtering, reconstructed pixel data output by the de-blocking filtering, reconstructed pixel data fed into the SAO filtering, reconstructed pixel data output by the SAO filtering, reconstructed pixel data stored in a frame buffer, motion-compensated pixel data, or intra-predicted pixel data, and the SAO filtering performs first visual quality comparison using the visual quality information of the candidate regions, and decides one partitioning of the reconstructed frame according to a result of the first visual quality comparison; or
   wherein the reconstructed frame is partitioned into a plurality of regions, the evaluated visual quality comprises visual quality information evaluated for a plurality of candidate SAO types of each of the regions, visual quality information evaluated for each of the candidate SAO types is decided based on at least one visual quality metric that is calculated according to raw data of a source frame, transformed coefficients, quantized coefficients, reconstructed pixel data fed into de-blocking filtering, reconstructed pixel data output by the de-blocking filtering, reconstructed pixel data fed into the SAO filtering, reconstructed pixel data output by the SAO filtering, reconstructed pixel data stored in a frame buffer, motion-compensated pixel data, or intra-predicted pixel data, and the SAO filtering performs second visual quality comparison using the visual quality information of the candidate SAO types, and decides one SAO type of said each of the regions by a candidate SAO type with best visual quality that is selected from the candidate SAO types according to a result of the second visual quality comparison.

\* \* \* \* \*

UNITED STATES PATENT AND TRADEMARK OFFICE
CERTIFICATE OF CORRECTION

PATENT NO. : 9,967,556 B2
APPLICATION NO. : 14/201944
DATED : May 8, 2018
INVENTOR(S) : Ho et al.

Page 1 of 1

It is certified that error appears in the above-identified patent and that said Letters Patent is hereby corrected as shown below:

On the Title Page

Item (73), correct the city of the assignee from "Hin-Chu" to --Hsin-Chu--.

Signed and Sealed this
Thirty-first Day of July, 2018

Andrei Iancu
*Director of the United States Patent and Trademark Office*